Nov. 3, 1970  TUTOMU KIMURA  3,537,789
LIGHT SOURCE FOR COLOR PRINTER
Filed April 15, 1968
FIG. 1
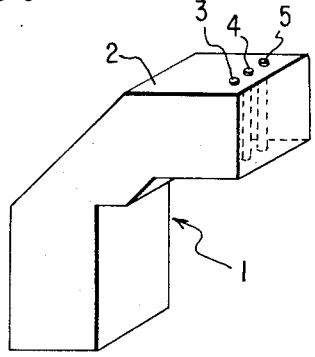
FIG. 2
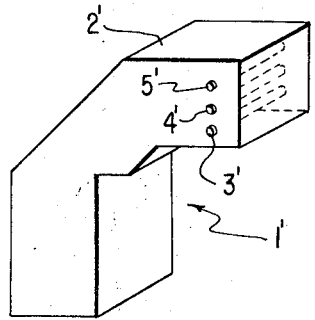
FIG. 3
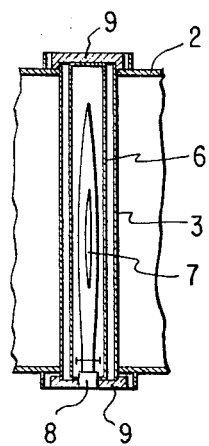
FIG. 5
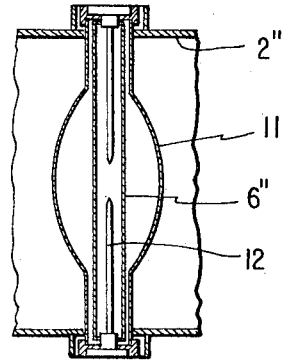
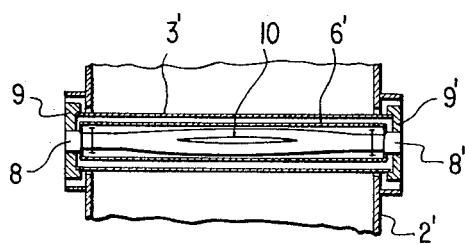
FIG. 4
INVENTOR
TUTOMU KIMURA
BY *Sughrue, Rothwell, Mion, Zinn & Macpeak*
ATTORNEYS.

United States Patent Office 3,537,789
Patented Nov. 3, 1970

3,537,789
LIGHT SOURCE FOR COLOR PRINTER
Tutomu Kimura, Minami-Ashigara Machi, Ashigara-Kamigun, Kanagawa, Japan, assignor to Fuji Photo Film Co., Ltd., Kanagawa, Japan
Filed Apr. 15, 1968, Ser. No. 721,322
Claims priority, application Japan, Apr. 15, 1967, 42/23,940
Int. Cl. G03b 27/76
U.S. Cl. 355—32    4 Claims

ABSTRACT OF THE DISCLOSURE

A trichromatic light source for a color printer in the form of three cylindrical color filters, each containing a lamp and positioned within a mirror box or light integrating device. The end(s) of each of the cylindrical filters extend exteriorly of the mirror box or light integrating device.

BACKGROUND OF THE INVENTION

The present invention relates to a light source for a color printer by which uniformly mixed trichromatic light permits trichromatic photosensitive materials, such as a color positive paper or film, to be printed from color negatives.

The prior art light sources for a color printer produces uniformly mixed trichromatic light by introducing light from three separate light source means into a mirror box or a light integrating device so that the introduced light is uniformly mixed. However, a light source of the type described above, requires means for removably placing lights within the mirror box or the light integrating device, thereby not only reducing the efficiency but also increasing the production cost.

The invention has developed a novel and useful light source for a color printer which can be used at high efficiency and can be produced at low cost. The light source of the present invention is characterized by assembling three separate light source means for the trichromatic light into a mirror box or a light integrating device. Although, three lamps of three colors constituting trichromatic light can be directly incorporated in the mirror box or the light integrating device to achieve the object, it is costly to use lamps provided with color filters, because color filters of high purity are required to obtain trichromatic light appropriate for printing color photosensitive materials and, therefore, the lamps rapidly burn out. Further, the life of the color filters is very short because of the high temperature resulting from the intense trichromatic light necessary for color printing. The reflecting surfaces, such as mirrors provided in the mirror box or the light integrating device are also rapidly damaged, because the mirror box or the light integrating device are heated to high temperature, thereby making the device practically useless.

The present invention avoids the above described disadvantages.

SUMMARY OF THE INVENTION

The present invention provides a novel and useful light source for a color printer, wherein three light source means for the trichromatic light are incorporated in a mirror box or a light integrating device, thereby permitting intense uniformly mixed trichromatic light to be obtained at high efficiency without damaging reflecting surfaces such as the mirrors and color filters. The present invention is characterized in that the cylindrical filters for trichromatic light each receives a light source means by insertion and are mounted in the mirror box or the light integrating device with the ends of each of said cylindrical filters being extending exteriorly of the mirror box or the light integrating device.

BRIEF DESCRIPTION OF THE DRAWINGS

FIG. 1 is a perspective view of one embodiment of a light integrating device incorporating the multiple light sources of the present invention;

FIG. 2 is a perspective view of yet another embodiment of the present invention;

FIG. 3 is a vertical sectional view of a portion of the device of FIG. 1;

FIG. 4 is a vertical sectional view of a portion of the device of FIG. 2; and

FIG. 5 is a vertical sectional view of a portion of a light integrating device forming yet another embodiment of the present invention.

DETAILED DESCRIPTION OF THE PREFERRED EMBODIMENT

FIG. 1 shows the light source 1 of the present invention in which vertically located light source means are provided. Cylindrical red color filter 3, cylindrical green color filter 4, and cylindrical blue color filter 5 are carried by mirror box light integrating device 2 of light source 1 of the color printer with the upper ends of said filters being opened to and extending exteriorly of said mirror box or light integrating device 2. Cylindrical heat intercepting filter 6 is located within each of said cylindrical color filters 3, 4 and 5 as shown in FIG. 3. Vertical iodine lamps 7 are fixed in each of said cylindrical heat intercepting filters 6 by means of socket 8. Light intercepting and heat radiating member 9 is also provided outside of each of the ends of filters 3, 4 and 5, and adjacent thereto.

FIG. 2 shows the horizontal light source 1' of the present invention. Cylindrical red color filter 3', cylindrical green color filter 4' and cylindrical blue color filter 5' are located in mirror box or light integrating device 2' of light source 1' of the color printer with both ends of said cylindrical color filters 3', 4' and 5' being opened to and extending exteriorly of said mirror box or said light integrating device 2'. A cylindrical heat intercepting filter 6' is provided in each of said cylindrical color filters 3', 4' and 5', as shown in FIG. 4. Horizontal iodine lamp 10 is fixed in each of said cylindrical heat intercepting filters 6' by means of socket 8'. A light intercepting and heat radiating member 9' is also provided outside of each of the ends of said cylindrical color filters 3', 4' and 5' adjacent thereto.

FIG. 5 shows the main part of the light source of the present invention in which arc lamps are provided, cylindrical color filter 11 having swelled portion intermediate both ends thereof, and is located in mirror box or light integrating device 2". Cylindrical heat intercepting filter 6" is located within the cylindrical color filter 11, in which arc lamp 12 is mounted.

In the above embodiments, cylindrical heat intercepting filters 6, 6' and 6" are used so that the light source such as iodine lamps 7, 10 and arc lamps 12 can be located close to cylindrical color filters 3, 3', 4, 4', 5, 5' and 11. Iodine lamps 7, 10 are compact in size and yet a large quantity of the light can be obtained therefrom permitting efficient printing. Arc lamps 12 are used when a greater quantity of light is required for carrying out printing of large size color prints.

Forced ventilation of air can be effected inside of said cylindrical color filters for cooling the same without influencing the interior of mirror box or light integrating device.

Since the light source of the present invention is provided with three light source means for trichromatic light, mounted in the mirror box or the light integrating device, as stated above, it is not necessary to provide light introducing optical systems such as condenser lenses and mirrors to achieve high efficiency. Further, only the cylindrical color filters are located in the mirror box or the light integrating device so that the lights from the light source means are directly supplied to the mirror box or the light integrating device. The heat generated in the light source means is discharged directly from the ends of the cylindrical color filters to the exterior of the mirror box or the light integrating device, therefore, the mirror box or the light integrating device can be kept at relatively low temperature, thus preventing the reflecting surfaces in the mirror box or the light integrating device from being damaged. Used lamps can be replaced with new ones without touching the elements in the mirror box or the light integrating device thereby preventing the reflecting surfaces from being contaminated with dust and the like.

Lamps to be used in the present invention are not limited to iodine lamps and arc lamps, and any kinds of discharge lamps, such as xenon lamps, can be used.

What is claimed is:

1. A trichromatic light source for a color printer employing a light integrating device or the like, the improvement comprising: a plurality of cylindrical color filters with lamps carried therein carried by and extending transversely across the interior of said light integrating device and a cylindrical heat intercepting filter fixedly positioned intermediate each lamp and its color filter.

2. The light source as claimed in claim 1 further including cylindrical heat intercepting filters fixedly positioned intermediate each lamp and its color filter.

3. The light source as claimed in claim 1 wherein at least one end of said cylindrical color filters open to the exterior of said light integrating device for facilitating replacement of the lamps and/or the filters and said light source further includes a light intercepting and heat radiating member carried by said light integrating device, overlying said end of said color filter.

4. The light source as claimed in claim 3 wherein said lamp comprises an arc lamp and said cylindrical color filter includes a swelled central portion to prevent thermal damage due to the heat output of said arc lamp.

References Cited
UNITED STATES PATENTS
3,083,614　4/1963　Veit _____ 355—38

NORTON ANSHER, Primary Examiner

R. A. WINTERCORN, Assistant Examiner

U.S. Cl. X.R.

350—311, 317; 355—38, 70